United States Patent
Hennessy et al.

(10) Patent No.: US 11,423,605 B2
(45) Date of Patent: Aug. 23, 2022

(54) SYSTEMS AND METHODS FOR REMASTERING A GAME SPACE WHILE MAINTAINING THE UNDERLYING GAME SIMULATION

(71) Applicant: Activision Publishing, Inc., Santa Monica, CA (US)

(72) Inventors: Padraic Hennessy, Niskayuna, NY (US); Kevin A. Todisco, Albany, NY (US); Jeffrey Allen Stewart, Albany, NY (US); Jeffrey Wai Lee, Niskayuna, NY (US); Matthew James Bishop, Waterford, NY (US); Acy James Stapp, Niskayuna, NY (US); Juan Gustavo Salvador Samour Lopez, Ballston Spa, NY (US); Alan Abram, Albany, NY (US); Taylor Courtney Hadden, Schenectady, NY (US); Nathaniel Derrick Staples, East Greenbush, NY (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

(21) Appl. No.: 17/085,599

(22) Filed: Oct. 30, 2020

(65) Prior Publication Data
US 2021/0134051 A1     May 6, 2021

Related U.S. Application Data

(60) Provisional application No. 62/929,735, filed on Nov. 1, 2019.

(51) Int. Cl.
*G06T 15/20* (2011.01)
*G06T 15/06* (2011.01)
*A63F 13/525* (2014.01)

(52) U.S. Cl.
CPC .......... *G06T 15/205* (2013.01); *A63F 13/525* (2014.09); *G06T 15/06* (2013.01)

(58) Field of Classification Search
None
See application file for complete search history.

(56) References Cited

U.S. PATENT DOCUMENTS

| 5,530,796 A | 6/1996 | Wang |
| 5,561,736 A | 10/1996 | Moore |

(Continued)

FOREIGN PATENT DOCUMENTS

| AU | 768367 | 3/2004 |
| AU | 2005215048 | 10/2011 |

(Continued)

OTHER PUBLICATIONS

Lembcke, Adding some perspective to your Unity 2D game, Aug. 25, 2017 [online: retrieved from https://www.gamedeveloper.com/programming/adding-some-perspective-to-your-unity-2d-game- on Sep. 14, 2021] (Year: 2017).*

*Primary Examiner* — Sultana M Zalalee
(74) *Attorney, Agent, or Firm* — Novel IP

(57) ABSTRACT

Embodiments of the present specification provide systems and methods to provide a 3D experience in a 2D game, while using the same underlying gaming engine. A 2D game space representing an axonometric projection is overlaid with 3D visuals, in a way that the original 2D simulation can still be used to run the game. In embodiments, a set of custom tools are used to map the 2D ground plane to a 3D ground plane. The 2D objects are then mapped into 3D objects. The 3D game environment corresponding to the original 2D game layout is created at backend by one or more individuals, using custom graphic tools. Dynamic player remap in 3D is generated in real time while the player engages with the 2D (Continued)

game. Therefore, while a player is playing the 2D game, a dynamic equivalent of the game in 3D is rendered.

18 Claims, 13 Drawing Sheets

(56) References Cited

U.S. PATENT DOCUMENTS

| | | | |
|---|---|---|---|
| 5,563,946 A | 10/1996 | Cooper | |
| 5,685,775 A | 11/1997 | Bakoglu | |
| 5,699,444 A * | 12/1997 | Palm | G06T 7/55 |
| | | | 382/106 |
| 5,706,507 A | 1/1998 | Schloss | |
| 5,708,764 A | 1/1998 | Borrel | |
| 5,736,985 A | 4/1998 | Lection | |
| 5,737,416 A | 4/1998 | Cooper | |
| 5,745,678 A | 4/1998 | Herzberg | |
| 5,748,199 A * | 5/1998 | Palm | H04N 13/133 |
| | | | 345/473 |
| 5,768,511 A | 6/1998 | Galvin | |
| 5,825,877 A | 10/1998 | Dan | |
| 5,835,692 A | 11/1998 | Cragun | |
| 5,878,233 A | 3/1999 | Schloss | |
| 5,883,628 A | 3/1999 | Mullaly | |
| 5,900,879 A | 5/1999 | Berry | |
| 5,903,266 A | 5/1999 | Berstis | |
| 5,903,271 A | 5/1999 | Bardon | |
| 5,911,045 A | 6/1999 | Leyba | |
| 5,920,325 A | 7/1999 | Morgan | |
| 5,923,324 A | 7/1999 | Berry | |
| 5,969,724 A | 10/1999 | Berry | |
| 5,977,979 A | 11/1999 | Clough | |
| 5,990,888 A | 11/1999 | Blades | |
| 6,014,145 A | 1/2000 | Bardon | |
| 6,025,839 A | 2/2000 | Schell | |
| 6,059,842 A | 5/2000 | Dumarot | |
| 6,069,632 A | 5/2000 | Mullaly | |
| 6,081,270 A | 6/2000 | Berry | |
| 6,081,271 A | 6/2000 | Bardon | |
| 6,091,410 A | 7/2000 | Lection | |
| 6,094,196 A | 7/2000 | Berry | |
| 6,098,056 A | 8/2000 | Rusnak | |
| 6,104,406 A | 8/2000 | Berry | |
| 6,111,581 A | 8/2000 | Berry | |
| 6,134,588 A | 10/2000 | Guenthner | |
| 6,144,381 A | 11/2000 | Lection | |
| 6,148,328 A | 11/2000 | Cuomo | |
| 6,185,614 B1 | 2/2001 | Cuomo | |
| 6,201,881 B1 | 3/2001 | Masuda | |
| 6,222,551 B1 | 4/2001 | Schneider | |
| 6,246,412 B1 * | 6/2001 | Shum | G06T 15/10 |
| | | | 345/419 |
| 6,271,842 B1 | 8/2001 | Bardon | |
| 6,271,843 B1 | 8/2001 | Lection | |
| 6,282,547 B1 | 8/2001 | Hirsch | |
| 6,311,206 B1 | 10/2001 | Malkin | |
| 6,334,141 B1 | 12/2001 | Varma | |
| 6,336,134 B1 | 1/2002 | Varma | |
| 6,337,700 B1 | 1/2002 | Kinoe | |
| 6,353,449 B1 | 3/2002 | Gregg | |
| 6,356,297 B1 | 3/2002 | Cheng | |
| 6,411,312 B1 | 6/2002 | Sheppard | |
| 6,426,757 B1 | 7/2002 | Smith | |
| 6,445,389 B1 | 9/2002 | Bossen | |
| 6,452,593 B1 | 9/2002 | Challener | |
| 6,462,760 B1 | 10/2002 | Cox, Jr. | |
| 6,469,712 B1 | 10/2002 | Hilpert, Jr. | |
| 6,473,085 B1 | 10/2002 | Brock | |
| 6,499,053 B1 | 12/2002 | Marquette | |
| 6,505,208 B1 | 1/2003 | Kanevsky | |
| 6,525,731 B1 | 2/2003 | Suits | |
| 6,549,933 B1 | 4/2003 | Barrett | |
| 6,567,109 B1 | 5/2003 | Todd | |
| 6,618,751 B1 | 9/2003 | Challener | |
| RE38,375 E | 12/2003 | Herzberg | |
| 6,657,617 B2 | 12/2003 | Paolini | |
| 6,657,642 B1 | 12/2003 | Bardon | |
| 6,684,255 B1 | 1/2004 | Martin | |
| 6,717,600 B2 | 4/2004 | Dutta | |
| 6,734,884 B1 | 5/2004 | Berry | |
| 6,765,596 B2 | 7/2004 | Lection | |
| 6,781,607 B1 | 8/2004 | Benham | |
| 6,819,669 B2 | 11/2004 | Rooney | |
| 6,832,239 B1 | 12/2004 | Kraft | |
| 6,836,480 B2 | 12/2004 | Basso | |
| 6,886,026 B1 | 4/2005 | Hanson | |
| 6,948,168 B1 | 9/2005 | Kuprionas | |
| RE38,865 E | 11/2005 | Dumarot | |
| 6,993,596 B2 | 1/2006 | Hinton | |
| 7,028,296 B2 | 4/2006 | Irfan | |
| 7,062,533 B2 | 6/2006 | Brown | |
| 7,143,409 B2 | 11/2006 | Herrero | |
| 7,209,137 B2 | 4/2007 | Brokenshire | |
| 7,230,616 B2 | 6/2007 | Taubin | |
| 7,249,123 B2 | 7/2007 | Elder | |
| 7,263,511 B2 | 8/2007 | Bodin | |
| 7,287,053 B2 | 10/2007 | Bodin | |
| 7,305,438 B2 | 12/2007 | Christensen | |
| 7,308,476 B2 | 12/2007 | Mannaru | |
| 7,404,149 B2 | 7/2008 | Fox | |
| 7,426,538 B2 | 9/2008 | Bodin | |
| 7,427,980 B1 | 9/2008 | Partridge | |
| 7,428,588 B2 | 9/2008 | Berstis | |
| 7,429,987 B2 | 9/2008 | Leah | |
| 7,436,407 B2 | 10/2008 | Doi | |
| 7,439,975 B2 | 10/2008 | Hsu | |
| 7,443,393 B2 | 10/2008 | Shen | |
| 7,447,996 B1 | 11/2008 | Cox | |
| 7,467,181 B2 | 12/2008 | McGowan | |
| 7,475,354 B2 | 1/2009 | Guido | |
| 7,478,127 B2 | 1/2009 | Creamer | |
| 7,484,012 B2 | 1/2009 | Hinton | |
| 7,503,007 B2 | 3/2009 | Goodman | |
| 7,506,264 B2 | 3/2009 | Polan | |
| 7,515,136 B1 | 4/2009 | Kanevsky | |
| 7,525,964 B2 | 4/2009 | Astley | |
| 7,552,177 B2 | 6/2009 | Kessen | |
| 7,565,650 B2 | 7/2009 | Bhogal | |
| 7,571,224 B2 | 8/2009 | Childress | |
| 7,571,389 B2 | 8/2009 | Broussard | |
| 7,580,888 B2 | 8/2009 | Ur | |
| 7,596,596 B2 | 9/2009 | Chen | |
| 7,640,587 B2 | 12/2009 | Fox | |
| 7,667,701 B2 | 2/2010 | Leah | |
| 7,698,656 B2 | 4/2010 | Srivastava | |
| 7,702,784 B2 | 4/2010 | Berstis | |
| 7,714,867 B2 | 5/2010 | Doi | |
| 7,719,532 B2 | 5/2010 | Schardt | |
| 7,719,535 B2 | 5/2010 | Tadokoro | |
| 7,734,691 B2 | 6/2010 | Creamer | |
| 7,737,969 B2 | 6/2010 | Shen | |
| 7,743,095 B2 | 6/2010 | Goldberg | |
| 7,747,679 B2 | 6/2010 | Galvin | |
| 7,765,478 B2 | 7/2010 | Reed | |
| 7,768,514 B2 | 8/2010 | Pagan | |
| 7,773,087 B2 | 8/2010 | Fowler | |
| 7,774,407 B2 | 8/2010 | Daly | |
| 7,782,318 B2 | 8/2010 | Shearer | |
| 7,792,263 B2 | 9/2010 | D Amora | |
| 7,792,801 B2 | 9/2010 | Hamilton, II | |
| 7,796,128 B2 | 9/2010 | Radzikowski | |
| 7,808,500 B2 | 10/2010 | Shearer | |
| 7,814,152 B2 | 10/2010 | McGowan | |
| 7,827,318 B2 | 11/2010 | Hinton | |
| 7,843,471 B2 | 11/2010 | Doan | |
| 7,844,663 B2 | 11/2010 | Boutboul | |
| 7,847,799 B2 | 12/2010 | Taubin | |
| 7,856,469 B2 | 12/2010 | Chen | |
| 7,873,485 B2 | 1/2011 | Castelli | |
| 7,882,222 B2 | 2/2011 | Dolbier | |
| 7,882,243 B2 | 2/2011 | Ivory | |
| 7,884,819 B2 | 2/2011 | Kuesel | |
| 7,886,045 B2 | 2/2011 | Bates | |

(56) References Cited

U.S. PATENT DOCUMENTS

| | | |
|---|---|---|
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | Finn |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | Mcvey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 10,713,839 B1* | 7/2020 | Summers ............... G06T 7/55 |
| 2006/0094503 A1* | 5/2006 | Ajioka ............... A63F 13/426 463/32 |
| 2006/0287058 A1* | 12/2006 | Resnick ............ G07F 17/3211 463/19 |
| 2009/0113448 A1 | 4/2009 | Smith |
| 2010/0060575 A1* | 3/2010 | Ohta .................... G06F 3/0346 345/158 |
| 2012/0030727 A1* | 2/2012 | Malik ................. H04N 13/337 725/151 |
| 2012/0194506 A1* | 8/2012 | Passmore .............. G11B 27/28 345/419 |
| 2012/0235988 A1* | 9/2012 | Karafin ............... H04N 13/261 345/419 |
| 2013/0212538 A1* | 8/2013 | Lemire .................. G06T 19/00 715/850 |
| 2014/0055445 A1* | 2/2014 | Cook .................... G06T 15/04 345/419 |
| 2014/0344725 A1 | 11/2014 | Bates |
| 2014/0348385 A1* | 11/2014 | Kozicz .................. F16P 3/142 382/103 |
| 2015/0139556 A1* | 5/2015 | Jeon ....................... G06T 7/73 382/218 |

(56) References Cited

U.S. PATENT DOCUMENTS

| | | | |
|---|---|---|---|
| 2015/0199572 A1* | 7/2015 | Kim | G06T 7/292 |
| | | | 382/103 |
| 2016/0086333 A1* | 3/2016 | Scholl | B60R 1/00 |
| | | | 701/300 |
| 2016/0191671 A1 | 6/2016 | Dawson | |
| 2017/0294020 A1* | 10/2017 | Crivella | G06T 7/75 |
| 2019/0364223 A1* | 11/2019 | Masuda | H04N 5/23238 |
| 2019/0374855 A1* | 12/2019 | Johnston | H04N 13/254 |
| 2020/0118329 A1* | 4/2020 | Pridie | G06T 17/00 |
| 2020/0154004 A1* | 5/2020 | Derry | H04N 5/2628 |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | 3033956 B2 | 4/2000 |
| JP | 3124916 B2 | 1/2001 |
| JP | 3177221 B2 | 6/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| MY | 117864 A | 8/2004 |
| SG | 55396 | 12/1998 |
| WO | 2002073457 | 9/2002 |
| WO | 20020087156 | 10/2002 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

* cited by examiner (2)

(5)

(1)

(4)

(3)

SYSTEMS AND METHODS FOR REMASTERING A GAME SPACE WHILE MAINTAINING THE UNDERLYING GAME SIMULATION

CROSS-REFERENCE

The present application relies on U.S. Patent Provisional Application No. 62/929,735, titled "Systems and Methods for Remastering a Game Space While Maintaining the Underlying Game Simulation" and filed on Nov. 1, 2019, which is herein incorporated by reference in its entirety.

FIELD

The present specification generally relates to multiplayer gaming. More particularly, the present specification relates to the overlay of two-dimensional (2D) game space with three-dimensional (3D) visuals, while the original 2D game engine or simulation is used to run the game.

BACKGROUND

There is an increasing interest in remastering popular historic games that were originally played using older versions of game engines, often rendered in two-dimensional (2D) graphics. The original game is redesigned to run on modern game platforms, resulting in higher fidelity graphics, and audio.

Due to the technological limitations of past gaming platforms, many of these historic games rendered their game worlds using 2D graphics engines. To provide the illusion of three dimensional game worlds, game developers could design a 2D game world to mimic being viewed from certain viewpoints that provide a 3D effect, revealing facets of the world that would not be visible from a top-down perspective or side view. These games were sometimes called "isometric" or "2.5D" video games, referring to their use of axonometric projections (isometric games were not limited to using isometric projections and could be designed using any number of viewpoints including diametric or trimetric projections).

There are known techniques for remastering these pseudo-3D isometric games. One technique sometimes referred to as an "up-res" focuses on recreating 2D game assets to bring them up to modern fidelity standards. While this technique improves the visual quality of the game's 2D assets, the game is still fundamentally 2D, which means it cannot easily leverage modern techniques used by 3D game engines like lighting, physics, collision, etc. Alternatively, the entire game may be recreated from scratch using a 3D game engine. This technique, however, often fails to maintain the identical gameplay and feel of the original game, and will not be backwards compatible with the original game. Furthermore, recreating the game from scratch is extremely time intensive and costly.

Accordingly, there remains a need for methods and systems for remastering games that enables the use of 3D assets in place of the original 2D assets while preserving the gameplay, feel, and compatibility with the original game.

SUMMARY

The following embodiments and aspects thereof are described and illustrated in conjunction with systems, tools and methods, which are meant to be exemplary and illustrative, and not limiting in scope. The present application discloses numerous embodiments.

In some embodiments, the present specification discloses a computer-implemented method of rendering a visual two-dimensional (2D) game space, generated by a 2D game engine, of a video game as a three-dimensional (3D) visual representation using at least one computing device, the method comprising: determining a perspective of a camera used in a generation of the visual 2D game space, wherein the perspective of the camera comprises a view of a ground plane and at least one object in the 2D game space; acquiring one or more screenshots of at least one portion of the 2D game space, wherein the one or more screenshots comprises the view of the ground plane and the at least one object; generating the 3D visual representation of the ground plane and the at least one object from the 2D game space using the one or more screenshots; overlaying the 3D visual representation onto the 2D game space; and executing the video game with the overlaid 3D visual representation using the 2D game engine.

Optionally, the at least one object comprises static objects.

Optionally, the 3D visual representation of the static objects are manually created before playing the 2D game space.

Optionally, the at least one object comprises dynamic objects.

Optionally, generating the 3D visual representation of the dynamic objects comprises remapping coordinates of the dynamic objects in real time while a player plays the video game.

Optionally, the 3D visual representation of the dynamic objects comprises using a raycast mapping of the dynamic objects in real time while a player plays the video game.

Optionally, the method further comprises using coordinates of at least one of the dynamic objects to map a position of the at least one dynamic object in real time while a player plays the video game.

In some embodiments, the present specification discloses a computer-implemented method of rendering a visual two-dimensional (2D) game space of a video game as a three-dimensional (3D) visual representation using at least one computing device, the method comprising: determining a perspective of a camera used in the generation of the visual 2D game space, wherein the perspective of the camera comprises a view of a ground plane in the 2D game space; configuring a 3D camera to replicate a 2D perspective; generating 3D data corresponding to 2D data; and, establishing a baseline 3D visual representation of the 2D game space using a game-accurate camera.

Optionally, the 3D camera is based on the determined 2D camera perspective.

Optionally, the baseline 3D visual representation includes at least one boundary box.

Optionally, the baseline 3D visual representation includes at least one collision map object.

Optionally, the 3D data is generated using custom tools, wherein the custom tools include at least one of workflow editing of the 2D game space, sculpting and shaping of models, using a library to enable Boolean operation on polygon geometry. shading of complex scenes, or viewing scene changes in real time.

In some embodiments, the present specification discloses a computer readable non-transitory medium comprising a plurality of executable programmatic instructions wherein, when the plurality of executable programmatic instructions are executed by a processor in a computing device, a process for generating and displaying a three-dimensional (3D)

visual representation of a two-dimensional (2D) video game space of a video game, wherein the plurality of executable programmatic instructions comprise: programmatic instructions, stored in the computer readable non-transitory medium, for determining a perspective of a camera used in the generation of the visual representation of the 2D video game space, wherein the perspective of the camera comprises a view of a ground plane and at least one object in the 2D video game space; programmatic instructions, stored in the computer readable non-transitory medium, for acquiring one or more screenshots of at least one portion of the 2D video game space, wherein the one or more screenshots comprises the view of the ground plane and the at least one object; programmatic instructions, stored in the computer readable non-transitory medium, for generating the 3D visual representation of the ground plane and the at least one object from the 2D video game space using the one or more screenshots; and programmatic instructions, stored in the computer readable non-transitory medium, for overlaying the 3D visual representation onto the 2D video game space.

In some embodiments, the present specification discloses a system configured to execute a video game by rendering a visual two-dimensional (2D) video game, generated by a 2D game engine, as a three-dimensional (3D) visual representation on at least one computing device, wherein the system comprises a plurality of programmatic instructions and wherein, when executed using at least one processor in the at least one computing device, the plurality of programmatic instructions: determine a perspective of a camera used in a generation of the visual 2D video game space, wherein the perspective of the camera comprises a view of a ground plane and at least one object in the 2D video game space; acquire one or more screenshots of at least one portion of the 2D video game space, wherein the one or more screenshots comprises the view of the ground plane and the at least one object; use the one or more screenshots to generate the 3D visual representation of the ground plane and the at least one object from the 2D video game space; overlay the 3D visual representation onto the 2D video game space; and execute the video game with the overlaid 3D visual representation using the 2D game engine.

Optionally, the at least one object comprises at least one of a static object or a dynamic object.

Optionally, the 3D visual representations of the static objects are manually created before playing the 2D video game space.

Optionally, generating the 3D visual representation of the dynamic objects comprises remapping coordinates of the dynamic objects in real time while a player plays the video game.

Optionally, the 3D visual representations of the dynamic objects comprises using a raycast mapping of the dynamic objects in real time while a player plays the video game.

Optionally, the system further comprises using coordinates of at least one of the dynamic objects to map a position of the at least one dynamic object in real time while a player plays the video game.

The aforementioned and other embodiments of the present specification shall be described in greater depth in the drawings and detailed description provided below.

BRIEF DESCRIPTION OF THE DRAWINGS

These and other features and advantages of the present specification will be further appreciated, as they become better understood by reference to the following detailed description when considered in connection with the accompanying drawings.

DETAILED DESCRIPTION

Figure 1B:
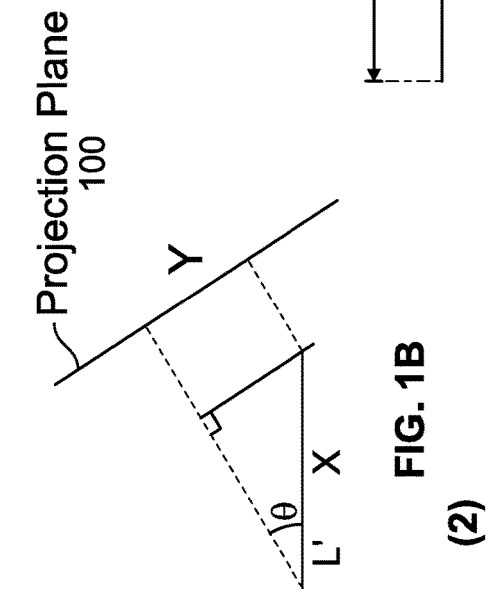
FIG. 1B is another exemplary line drawing that may be provided in a 2D game space to describe the determination of pitch of the camera.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present specification is directed towards multiple embodiments. For example, the systems and methods described herein may be applied to multiplayer video games in numerous genres, including first person shooter (FPS) games, fighting games, survival games, action-adventure games, role-playing games, simulation games, strategy games, sports, card games, and racing games.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

As used herein, the indefinite articles "a" and "an" mean "at least one" or "one or more" unless the context clearly dictates otherwise.

It should be appreciated that the programmatic methods described herein may be performed on any computing device, including a laptop, desktop, smartphone, tablet computer, specialized gaming console, or virtual reality system. The computing device comprises at least one processor and a nonvolatile memory that stores the programmatic instructions which, when executed by the processor, perform the methods or steps disclosed herein, including the generation of a graphical user interface that is communicated to a local or remote display. The computing device is in communication with at least one remotely located server through a network of any type.

In some embodiments, execution of a plurality of sequences of programmatic instructions or code enables or causes the CPU of the computing device to perform various functions and processes. In alternate embodiments, hardwired circuitry may be used in place of, or in combination with, software instructions for implementation of the processes of systems and methods described in this application. Thus, the systems and methods described are not limited to any specific combination of hardware and software.

Definitions

For purposes of this specification only, the following definitions are adopted.

The term 'axonometric' refers to using or designating an orthographic projection of an object, such as a building, on a plane inclined to each of the three principal axes of the object. Therefore, an axonometric image refers to a three-dimensional (3D) image but without perspective.

The term 'collision map' refers to a representation of an area of the game, including objects, obstacles, walls, and others, which could collide with a dynamic object, such as a player's avatar. The collision map visually delineates the areas in the game that the player cannot walk through or traverse.

The term 'cross-compatibility' refers to interoperability of two versions of a game. Two versions of a game are cross-compatible if a user playing an older version of the game is able to play with a user playing a newer version of the game.

The term 'raycast' refers to an operation of sending out a ray in a specific direction and from a specific position, such as the position of a player or from the viewpoint of the camera.

The term 'remap' refers to a process of altering a game from a 2D format to a 3D format, while the underlying game engine remains the same.

The term 'texture UV mapping' refers to a process where a 2D surface, referred to as a texture map, is projected onto a 3D object. In texture mapping, the letters 'U' and 'V' define the axes of the 2D surface ('X', 'Y', and 'Z' define the axes of the 3D object).

The term 'module' used in this disclosure may refer to computer logic utilized to provide a desired functionality, service or operation by programming or controlling a general purpose processor. In various embodiments, a module can be implemented in hardware, firmware, software or any combination thereof. The module may be interchangeably used with unit, logic, logical block, component, or circuit, for example. The module may be the minimum unit, or part thereof, which performs one or more particular functions.

The term 'player' refers to any human or virtual actor within a game, where the human or virtual actor may engage in play actions, social actions, administrative actions, or observation actions.

Embodiments of the present specification provide systems and methods to remaster visual elements of a videogame, while preserving or reusing aspects of the original game engine. In embodiments, a 2D game level representing an axonometric projection is overlaid with a 3D scene such that the original 2D game engine can still be used to run/execute the game. In embodiments, a set of custom tools are used to recreate the original 2D version of the level in 3D. In embodiments, the 2D ground plane is recreated in a 3D scene. After the ground plane is recreated, 3D versions of the 2D objects are created and placed in the 3D scene. Dynamic player remap in 3D is generated in real time while the player engages with the 2D game. Therefore, while a player is playing the 2D game, a dynamic equivalent of the game in 3D is rendered.

In embodiments, a 3D camera is configured and positioned to replicate aspects of the axonometric projection. 3D objects are constructed and placed so that their projected positions and/or silhouettes generally match the 2D visuals on the projection plane. By doing so, the original collision maps and 2D simulation may be used in order to preserve the behavior and feel of the original game. In some embodiments, a coordinate mapping system is used to leverage UV texture mapping to relate 2D collision and position data on to a ground plane. Objects in a 2D plane may appear to be a 3D scene (such as stairs or an elevation change, for example), giving the 2D ground plane a perceived depth, although it is still 2D. During coordinate mapping, a point, defined by coordinates (x, y), in the 2D space can be related to a point (x', y', z') on a corresponding 3D model. Therefore, a third dimension (z') is added and the x and y dimensions are remapped (to x', y'). This method can be used to denote where to draw static and dynamic objects. One method for doing so is to set a ground plane baseline (static) and then translate the position of a character (dynamic) with respect to the baseline. The character is dynamic, so the ground plane takes complexity out of it by providing information of where the character is on the ground plane or relative to the ground plane, in order to map the character into the 3D space.

In further embodiments, the custom tools are configured to facilitate authoring of 3D data corresponding to the 2D data. In one embodiment, for example, screenshots of original 2D game spaces may be transparently or opaquely overlaid above the 3D geometry being authored (or the 3D geometry may be transparently or opaquely overlaid above the 2D game space), and a game-accurate diametric camera may be constructed so that a content creator can model objects that match the size and silhouette of the recreated objects.

Systems and Methods for Creating a 3D Version of a 2D Game World

In embodiments, the present specification employs a set of programmatic tools configured to generate 3D collision maps and positions of objects, corresponding to the original 2D collision maps and objects. The conversion of the 2D collision map and objects is performed by a combination of computer-implemented algorithms and one or more individuals using custom tools. The conversion typically provides an initial static lay of the land in the game, which is subsequently used to determine the positions of one or more dynamic objects. It should be noted herein that not all static objects need be recreated at the same time. In embodiments, a bounding box may be used as a placeholder for establishing a position of a static object. In embodiments, only a portion of the game need be remastered or recreated in order to take advantage of the present invention. Additionally, the static lay of the land may be edited and/or further developed in detail during or after generation of 3D collision maps and positions of objects.

As is well known, 2D games may use a variety of viewpoints to simulate a 3D game space. For example, 2D games have adopted a wide variety of axonometric projections including isometric, dimetric, or trimetric projections. In embodiments, the original perspective of a camera used in the 2D game is determined. A 3D camera is configured and positioned to replicate the original perspective and projection of the 2D game.

An axonometric projection can be extrapolated onto a camera orientation and position using the relative foreshortening that occurs on each principal axis of a Cartesian coordinate space. With respect to orientation, a 3D orientation consists of three values, most commonly referred to as pitch (rotation about the left-right axis), yaw or heading (rotation about the up-down axis), and roll (rotation about the forward axis). For purposes of this example, roll can be ignored since axonometric projections, by conventional definitions, do not involve roll. Thus, only the pitch and yaw of the camera need be derived. In the example, a ground plane is considered as defined by the plane formed by the x- and z-axes in 3D space. Accordingly, in a in one embodiment, the processor, executing a plurality of stored programmatic instructions, receives a 2D image, determines dimensions defining visual boundaries of each visual element in the 2D image, calculates a pitch of the camera based on a projection of one or more of the dimensions onto the camera's projection plane, calculates a yaw of the camera based on a projection of one or more of the dimensions onto the camera's projection plane, the camera position and field of view are determined, and displaying a 3D representation based on the determined yaw, pitch, position, and field of view.

Figure 1E:
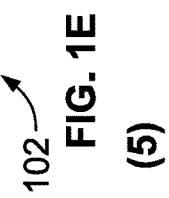
FIG. 1E illustrates, by way of an example, a method for determining a position of the camera.
Figure 1A:
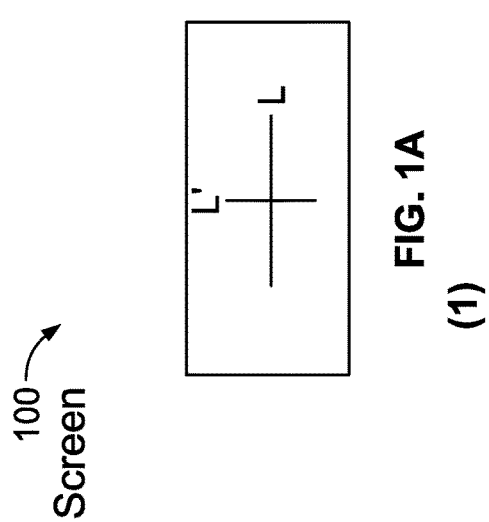
FIG. 1A is an exemplary line drawing that may be provided in a 2D game space to describe the determination of pitch of a camera.

FIGS. 1A, 1B, 1C, 1D, and 1E illustrate exemplary line drawings of a line graphic that may be provided in a 2D game space. FIGS. 1A and 1B illustrate, by way of an example, a method for determining the pitch of the camera. Referring to FIG. 1A, a line, L, is shown as having a unit length that is oriented perpendicular to a camera's forward vector, such as a segment of the horizon. Referring to FIG. 1B, this line L is projected on to the camera's projection plane (the screen) 100, and is oriented in such a way that it is at its maximum projected length (X) on the screen 100. Consider a line of equal length, L', that is placed flat on the ground plane parallel to the camera's forward vector. A projected length of L' on the screen 100 is represented by a value Y. FIG. 1B illustrates the view of lines L and L' from a side. Plane 100 represents the screen onto which the scene of lines L and L' is projected. As observed, a right triangle may be formed out of the line L', and the projection of that line L' on the screen, which has a length of Y. Since L' and L are of equal length, therefore L' may be replaced with the maximum projected length establish by L, which is X. The pitch of the camera downward from the horizon is equal to the angle θ that lies opposite the side of the triangle represented by the projection of L' onto the screen. Therefore, the pitch of the camera is equal to the sine of the fraction Y/X.

Figure 1D:
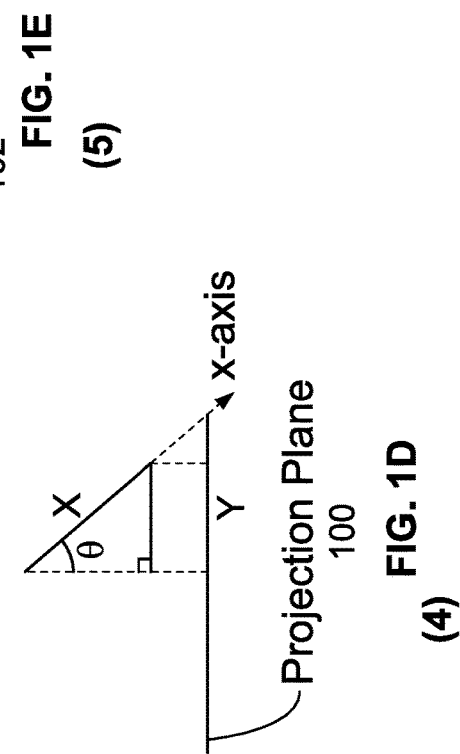
FIG. 1D is another exemplary line drawing that may be provided in a 2D game space to describe the determination of yaw of the camera.
Figure 1C:
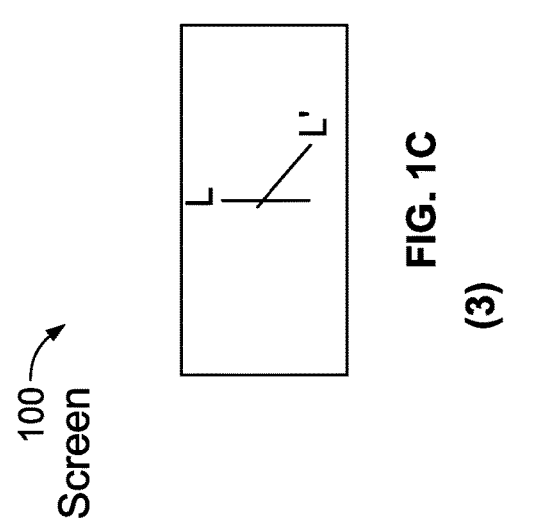
FIG. 1C is an exemplary line drawing that may be provided in a 2D game space to describe the determination of yaw of a camera.

The yaw of the camera may be determined by a similar method, which is illustrated in FIGS. 1C and 1D illustrate, by way of example. Referring to FIG. 1C, in this method, the line of unit length, L, is oriented such that it projects vertically onto the screen 100 and is perpendicular to the camera's forward vector. In this way, it will always project to its maximum screen length regardless of the yaw of the camera. This maximum projected length is denoted by X. A line L' of equal length to line L, can be placed on the ground plane along a principal axis of that plane in 3D space, for example, the x-axis. The line L' experiences foreshortening when projected onto the screen 100 depending on the yaw of the camera, and a value of the projected length of L' is represented by Y. FIG. 1D illustrates a top-down view of the scene of L and L'. FIG. 1D shows that similar to the formulation for camera pitch seen in FIG. 1B, a right triangle may be formed consisting of the line L, as the hypotenuse, and the projection of that line on to the projection plane 100. It follows that the camera's angle of deviation from the x-axis is the angle opposite the segment Y, which is represented by θ. Therefore, the yaw of the camera is the sine of the fraction Y/X.

Using the formulations described above, the pitch and yaw of a camera that replicates any axonometric view can be determined.

In an embodiment, the projected diagonal L of a ground tile, perpendicular to the camera represents 160 pixels and has a projected length of value X. The other diagonal L' of the triangle projects vertically and represents 80 pixels and a projected length of value Y. Then, the ratio of Y:X is 0.5, and the inverse sine of 0.5 provides the camera pitch of 30 degrees downward from the horizon.

In an embodiment, a heuristic can be used to establish that the yaw of the camera is 45 degrees of deviation from the x-axis, due to the equal foreshortening of the x- and z-axes. However, this can still be derived by considering a tile with a diagonal length of 160 units. The sides of the triangle are of length 160/√(2) (by trigonometric laws), and these sides project to a length of 80 units. The side of the triangle is X, and the projection of 80 units is Y. Simplifying, we have $80*\sqrt{(2)}/160$, which equal 0.707107, and the inverse sine of that is 45 degrees.

For position, a 3D camera has properties such as field-of-view, which is an angle that describes the extents of the camera's visual field, and a position. The field-of-view (FOV) and the position of the camera determines how much of the scene is visible to the camera. The position of the camera is derived given properties of the axonometric 2D game, in accordance with embodiments of the present specification.

FIG. 1E illustrates, by way of an example, a method for determining a position of the camera. Referring to FIG. 1E, a typical view of a 2D game is considered. The width of visible play space, denoted by W, is the distance in game units from a point on a left edge of the visible play space to a point on a right edge of the visible play space. The position 102 of the camera is determined from a point on the edge of the visible play space, and a point at the center of the visible play space, form a right triangle. The side opposite the camera is of length W', equal to W/2. The length D of the edge connecting the point in the middle of the play area to the camera is the distance of the camera from its point of focus and is the value we want to find. The value of and angle θ, formed by the right angled triangle with sides W' and D, is equal to half of the camera's field-of-view. The relationship between these three values is defined by the trigonometric function $\tan(\theta)=W'/D$. Rearranging, we have $D=W'/\tan(\theta)$. Solving for D provides the position of the camera by subtracting the negated camera forward vector from the focus point of the camera in 3D space.

In one embodiment, the above calculations are used to derive the offset of the camera. The field of view is calculated to approximately match a fake perspective mode in the 2D game, and also count 50 game units of space visible in the play area. This gives W' a value of 25 and θ a value of 0.08, which results in D=883.88 units.

Figure 1F:
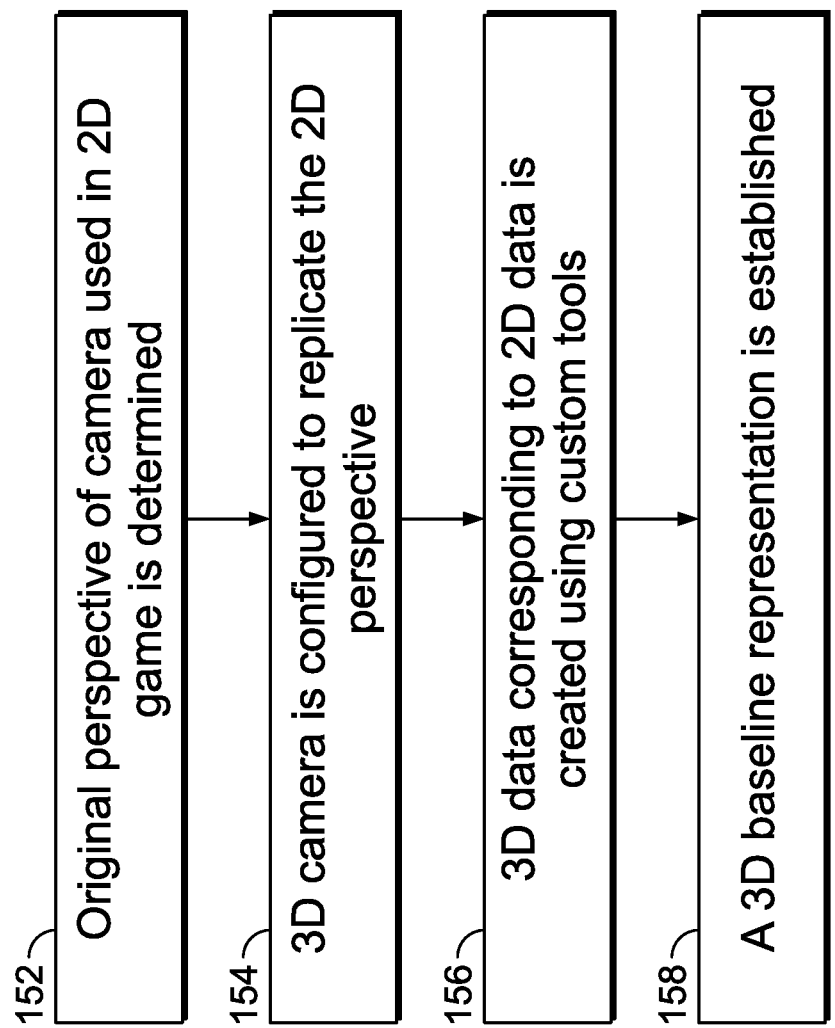
FIG. 1F is a flow chart illustrating an exemplary process for using custom tools to create a baseline 3D game space, in accordance with some embodiments of the present specification.

FIG. 1F illustrates a flow chart of an exemplary process for creating a baseline for a 3D game space, in accordance with some embodiments of the present specification. Referring simultaneously to FIGS. 1A, 1B, 1C, 1D, 1E and 1F, at step 152, the original perspective of the 2D camera is determined. At step 154, the 3D camera is configured and positioned to replicate the perspective of the 2D camera. A tile represented by lines L and L', based on projection manipulation in accordance with the embodiments, is used to illustrate the creation of an illusion of a 3D image. In the embodiment, an inverse diametric projection technique is used to determine the angle of the tile in the original 2D space.

At step 156, custom tools are configured and used to author 3D data corresponding to the 2D data. In one embodiment, for example, screenshots of original 2D game spaces may be transparently or opaquely overlaid above the 3D geometry being authored (or the 3D geometry may be transparently or opaquely overlaid above the 2D game space). At step 158, a game-accurate diametric camera and/or a 3D baseline representation may be constructed so that a content creator can model objects that match the size and silhouette of the recreated objects.

Figure 1G:
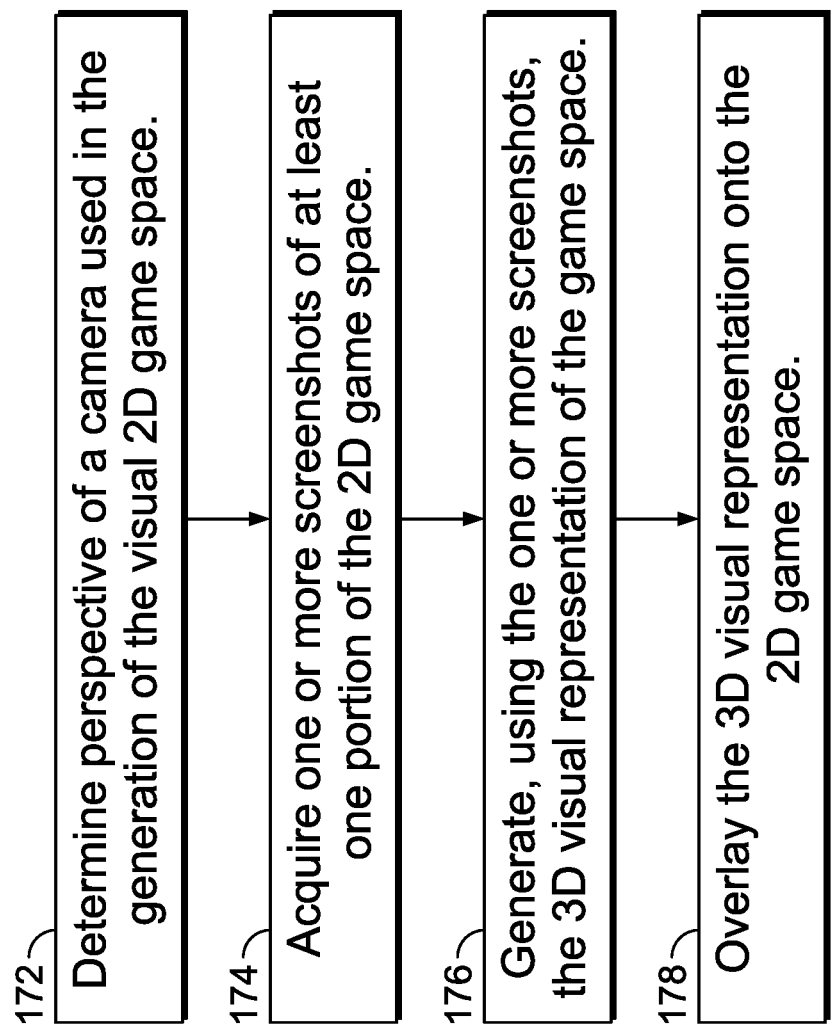
FIG. 1G is a flowchart of a method depicting steps for rendering a visual two-dimensional (2D) game space of a video game into a three-dimensional (3D) visual representation, in an embodiment.

FIG. 1G is a flowchart of a method depicting steps for rendering a visual two-dimensional (2D) game space of a video game into a three-dimensional (3D) visual representation, in an embodiment. At step 172, the perspective of a camera used in the generation of the visual 2D game space is determined. The camera perspective comprises, in embodiments, a view of a ground plane and at least one object in the 2D game space. In embodiments, the at least one object comprises both static and dynamic objects. At step 174, one or more screenshots of at least one portion of the 2D game space is acquired. In embodiments, the one or more screenshots comprises the view of the ground plane and the at least one object that was included in the camera perspective of the previous step. At step 176, the one or more screenshots may be used to generate the 3D visual representation of the ground plane and the at least one object from the 2D game space. At step 178, the 3D visual representation is overlaid onto the 2D game space. In embodiments, the 3D visual representation of the static objects is manually created before playing the 2D game space.

Figure 1H:
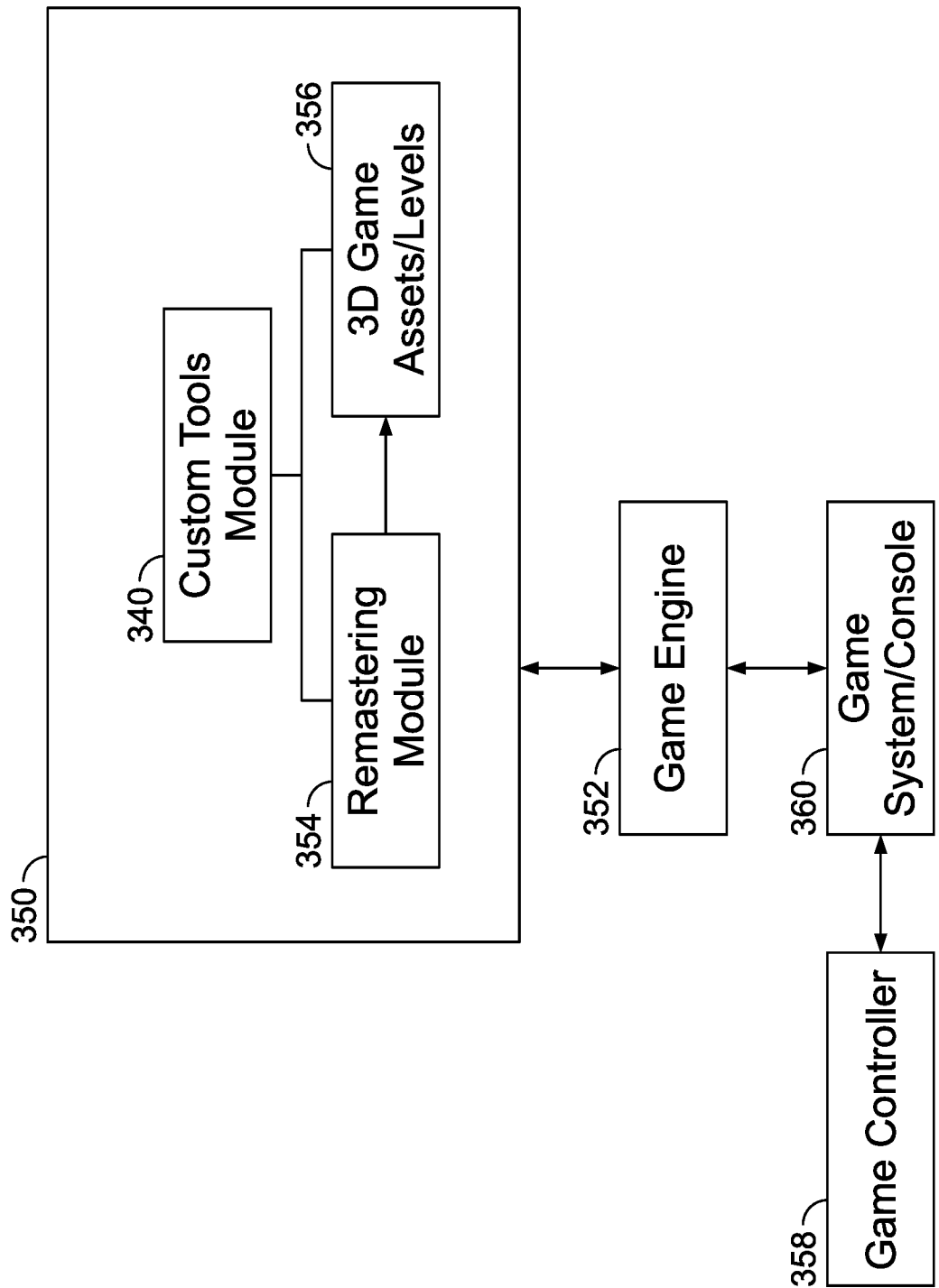
FIG. 1H illustrates a set of exemplary video game components, in accordance with some embodiments of the present specification.

FIG. 1H illustrates some exemplary modules of a computing system 350 that may be used to remaster a 2D game to a 3D game. The computer system comprises a plurality of programmatic instructions that, when executed, provide a front-end GUI (Graphical User Interface) through which a plurality of custom tools may be programmed, as further described below. In various embodiments, the computer system includes conventional computer components such as a processor, necessary non-transient memory or storage devices such as a RAM (Random Access Memory) and disk drives, monitor or display and one or more user input devices such as a keyboard and a mouse. In embodiments, the user input devices allow a user to select objects, icons, and text that appear on the monitor via a command such as a click of a button on a mouse or keyboard. The computer system is also in communication with one or more game engines and/or gaming consoles. The computer system and/or gaming systems and consoles may also include software that enables wireless or wired communications over a network such as the HTTP, TCP/IP, and RTP/RTSP protocols. It should further be appreciated that the GUI may be implemented on a standalone computer or laptop or via one or more local or remotely located servers in a "cloud" configuration.

According to aspects of the invention, a remastered version of a 2D game is created in which aspects of the 2D game's original game engine are used to drive and control gameplay in the remastered 3D game space. In embodiments, a player generates inputs through a controller 358, which is in wired or wireless data communication with a video game system 360. The inputs are received and processed by the game engine 352, which, in turn, is in wired or wireless data communication with video game system 360. In embodiments, the game engine 352 includes the original game engine for the 2D version of the game, and the simulation of the gameplay occurs in the 2D game space. In embodiments, a remastering module 354 receives from the game engine 352 positional data of moving objects and characters in the 2D game space and converts that data, in real-time or substantially in real-time, to positional data in the 3D game space. The resulting positional data in the 3D game space can be used to render gameplay events in the 3D world, by a 3D game assets/levels module 356. A custom tools module 340 enables designers to work on 3D graphics applications, such as Maya, or any other application as described below, to remaster the 2D game space and create 3D objects, thereby creating the remastered 3D game space and characters. Aspects of the invention provide for remastered video games that take advantage of modern hardware, while maintaining backwards compatibility and a high degree of resemblance and gameplay fidelity with the original game.

Figure 2A:
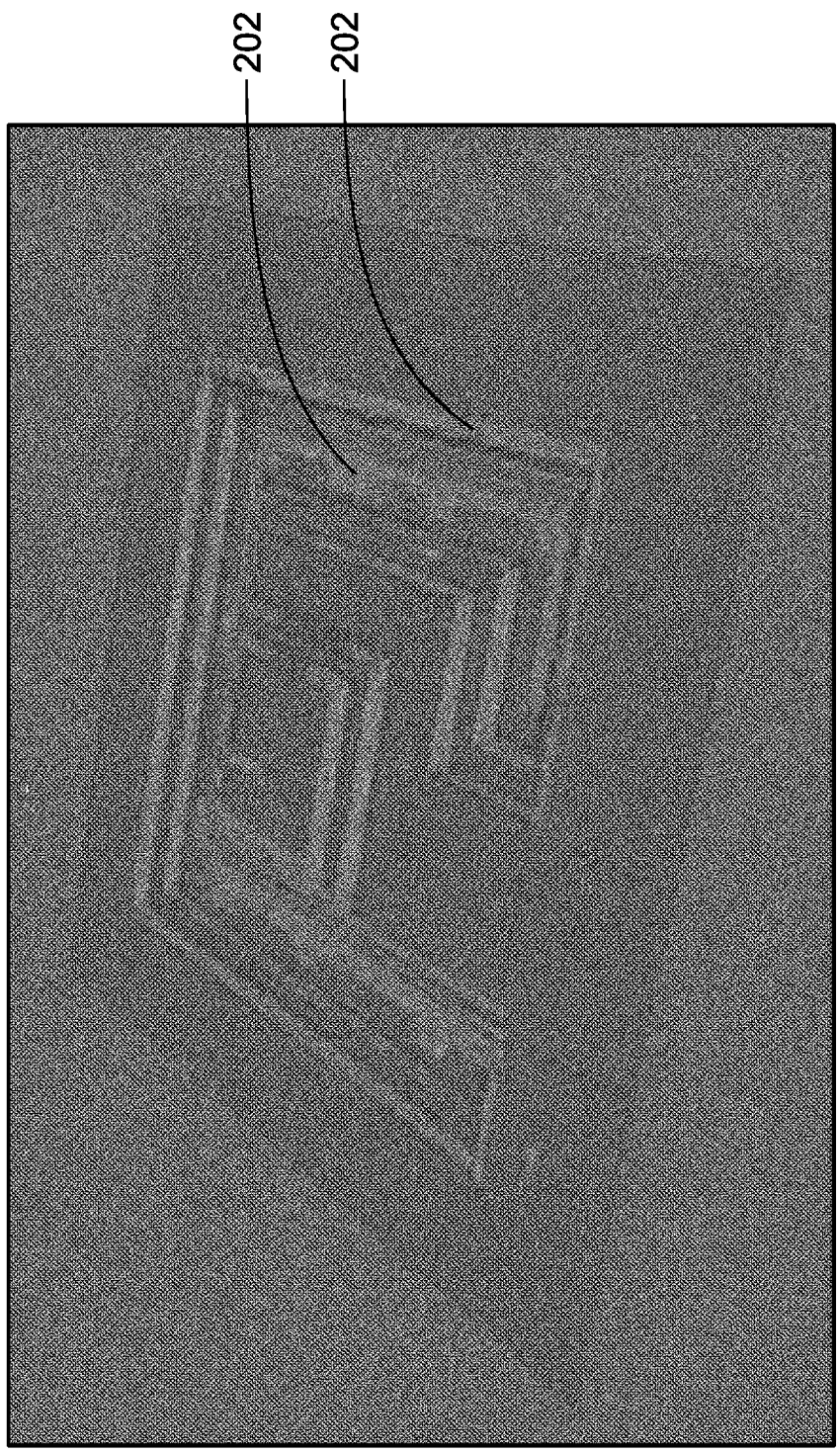
FIG. 2A is an exemplary illustration of a collision remap of a 2D game space, created in 3D.
Figure 2B:
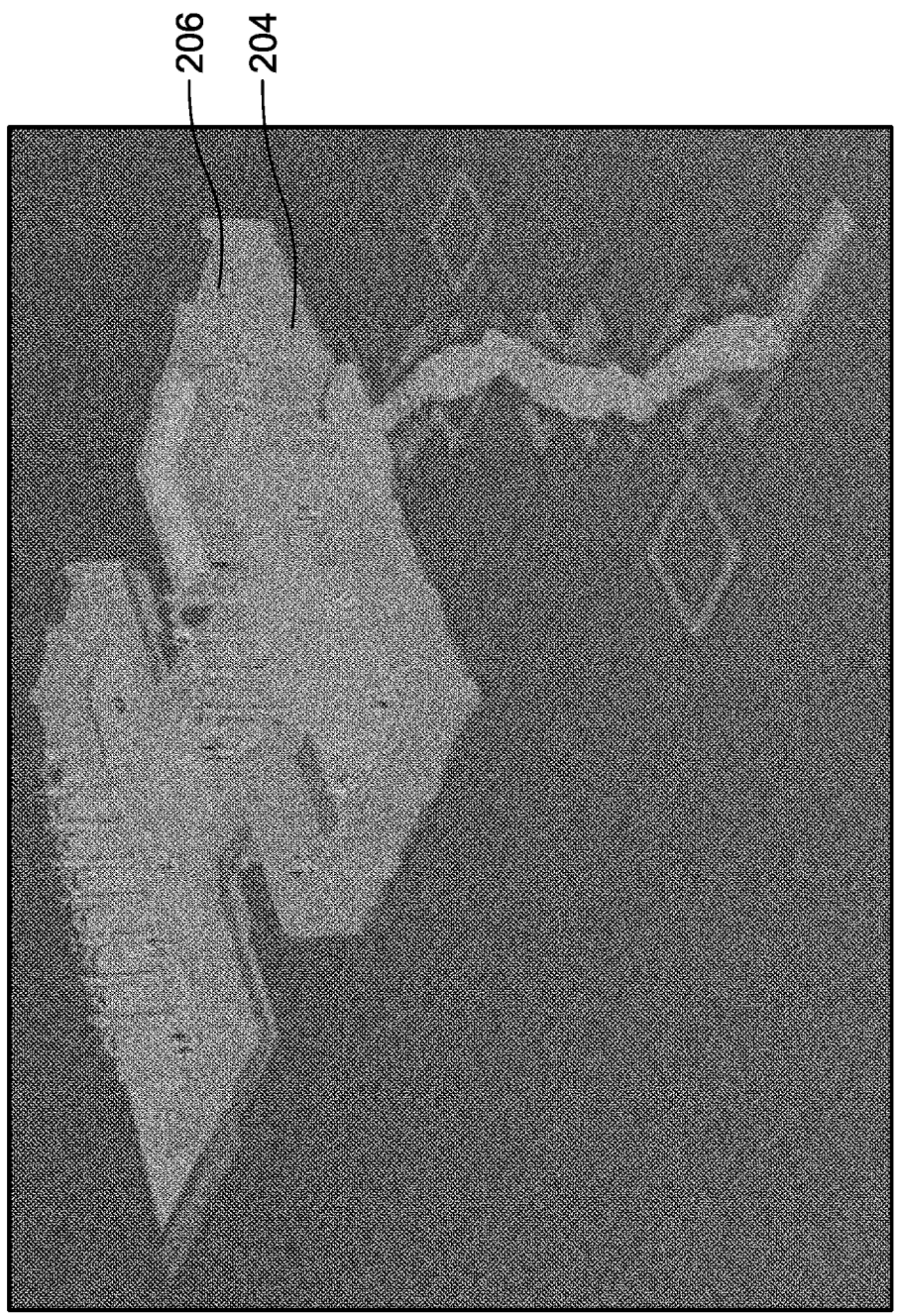
FIG. 2B illustrates another exemplary embodiment of a collision map of another 2D game space created further than that in FIG. 2A, in 3D.

FIG. 2A is an exemplary illustration of a 3D game space recreated based on a 2D game space in accordance with embodiments of the present specification. FIG. 2A shows a 3D ground plane with actual elevation changes that were simulated in the 2D game space. The shaded portions 202 also illustrate collision barriers for the game space. FIG. 2B illustrates another exemplary embodiment of a collision map 204 of another 2D game space further including 3D static objects 206 overlaid on the collision barriers. Custom tools are used by one or more artists to recreate each level of the original 2D game in 3D with the collision barriers and objects matching those of the original 2D game.

In embodiments, 3D objects are constructed and placed so that their projected positions and silhouettes generally match the 2D versions of those objects on the projection plane. This is achieved by determining the perspective of the 2D projection and using the same perspective for the 3D camera. In embodiments, a creator may select relevant objects for converting to 3D, and other selected objects may not necessarily be converted to 3D. In further embodiments, a raycast may be used to relate points on the original game's 2D ground plane to the equivalent point on a 3D ground plane which is aligned to the 2D ground plane in screen-space. Just as 3D objects are placed by content creators such that their silhouettes align on the screen, so can dynamic objects be placed in 3D such that their outline aligns with the equivalent object in 2D. In embodiments, the selection of items/objects/characters to convert is game-dependent. For example, in embodiments, certain game characteristics may be deemed more important for conversion, such as heroes, characters, and inanimate objects that are critical to establishing a scene, including, but not limited to weapons and vehicles that may be usable to the player or buildings/structures with which the player can interact. In embodiments, certain aspects of the setpiece may not be converted, such as inanimate paintings or a bookshelf, where such items are not critical to gameplay and where such items are not player usable. To facilitate the creation of the 3D ground plane and placement of objects, screenshots are taken of one or more portions of each level of the 2D game. The custom tools then allow designers to recreate aspects of the 2D game in a 3D game space by superimposing the screenshots of the 2D game space in the designers' 3D workspace. The designers can then create a 3D game space, including a ground place, terrain, and objects, that substantially aligns with the 2D game space. In some exemplary embodiments, an off the shelf tool such as Maya or Autodesk 3ds Max, is used to generate 3D visuals for overlaying onto the 2D game space of the 2D game. Maya and 3ds Max are applications that may be used to create 3D games (among other things). Embodiments of the present specification provide additional custom tools that enhance capabilities of applications such as Maya and 3ds Max. In alternative embodiments, other applications or tools that enable the designers to create 3D games may be used. Other non-limiting examples of such tools and applications include Houdini, Cinema 4D, Modo, Blender, Lightwave 3D, ZBrush, among others.

Figure 3A:
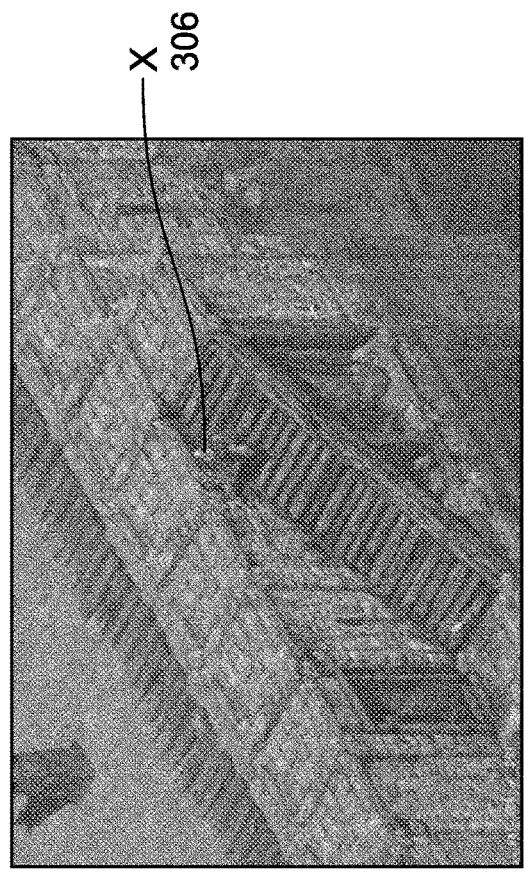
FIG. 3A is a screenshot of a 2D game represented in 3D, in accordance with an embodiment of the present specification.
Figure 3B:
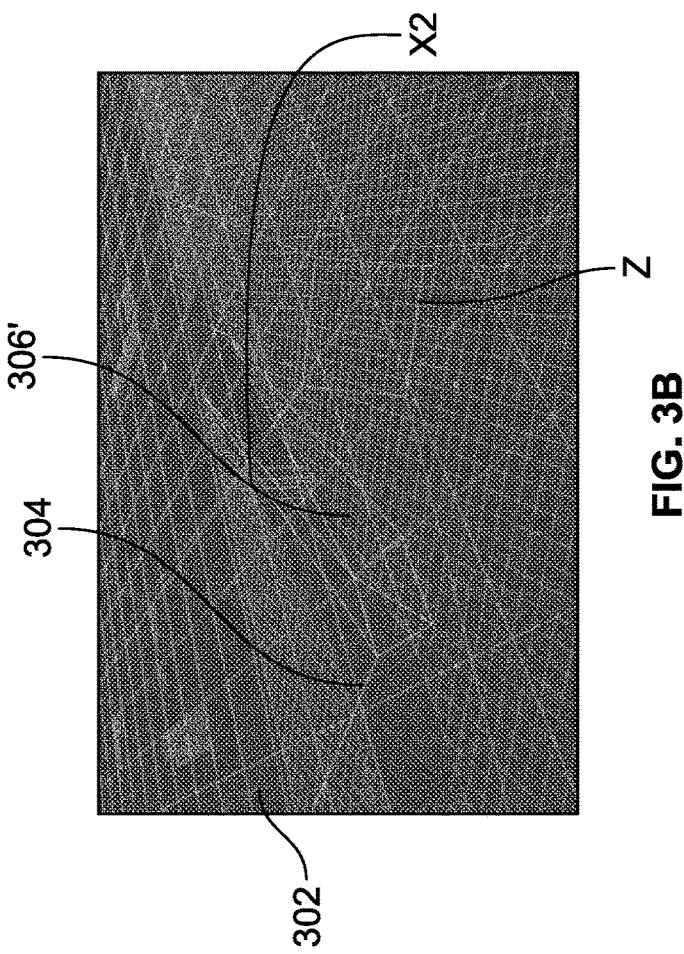
FIG. 3B illustrates bounding boxes or the actual geometry of the 2D space and the 3D space corresponding to the screenshot of FIG. 3A.

FIG. 3A is a screenshot of a 2D game represented to be remastered in 3D in accordance with embodiments of the present specification. The screenshot includes a player-controlled character 306 labelled X. FIG. 3B illustrates aspects of the remastered 3D space corresponding to the screenshot of FIG. 3A. In some embodiments, coordinate mapping is used to map the (x, y) coordinates of the 2D game space to (x', y', z') coordinates in the 3D space, to generate the remastered ground plane in 3D. A wireframe cube is a bounding box X2 306' that represents the character X 306 from FIG. 3A and is used by a designer to create the actual character in 3D. In the game, the 3D camera would be positioned to replicate the perspective of the 2D game.

Figure 4A:
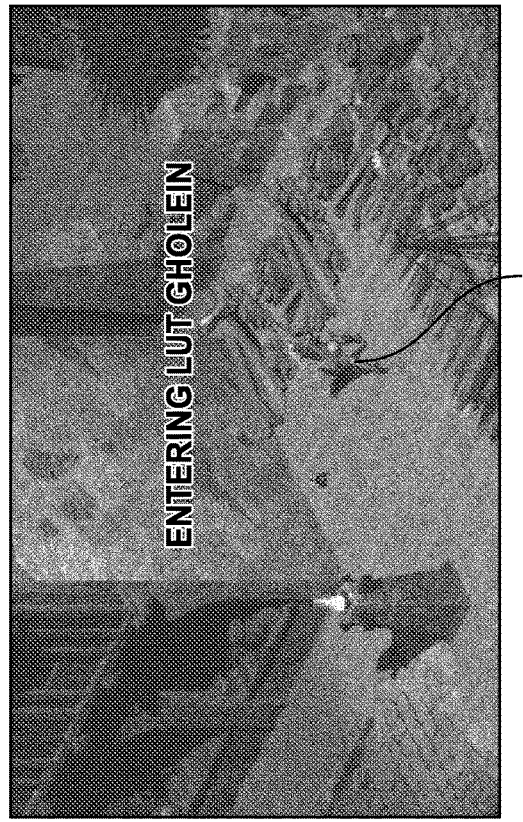
FIG. 4A illustrates an exemplary 3D representation of a dynamically positioned character in a 2D game, in accordance with an embodiment of the present specification.
Figure 4B:
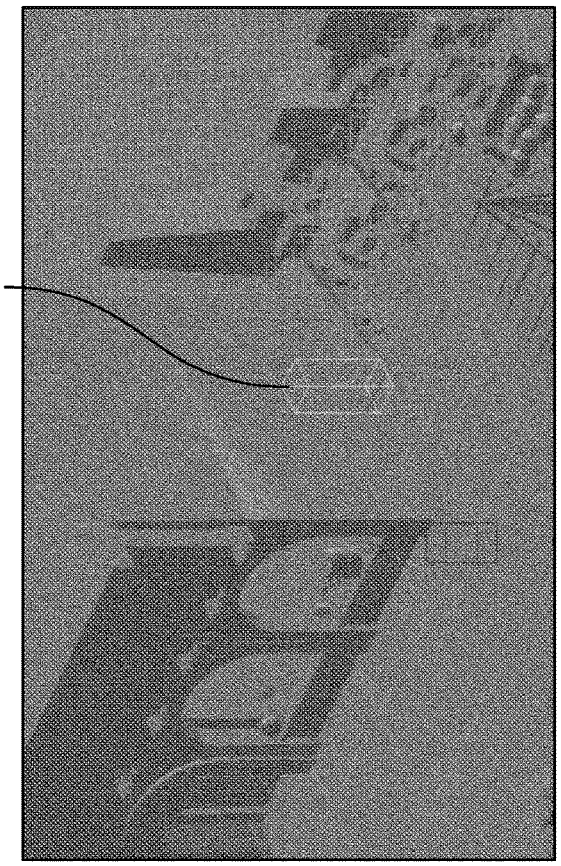
FIG. 4B illustrates remapped coordinates of the dynamically positioned character of FIG. 4A, in accordance with an embodiment of the present specification; and, FIG. 5 illustrates a diametric tool overlay created by the custom tools, in accordance with another embodiment of the present specification.

Video Game Combining the Original 2D Game Engine and the Remastered 3D Game Space Referring again to FIGS. 3A and 3B, position mapping of a dynamic character 306 in the 3D representation, is performed by remapping each time the character moves in reference to the ground plane. FIG. 4A illustrates an exemplary 3D representation of a dynamically positioned character 402 in a 2D game, in accordance with an embodiment of the present specification. FIG. 4B illustrates remapped coordinates in a bounding box 402' of the dynamically positioned character of FIG. 4A, in accordance with an embodiment of the present specification.

Figure 3C:
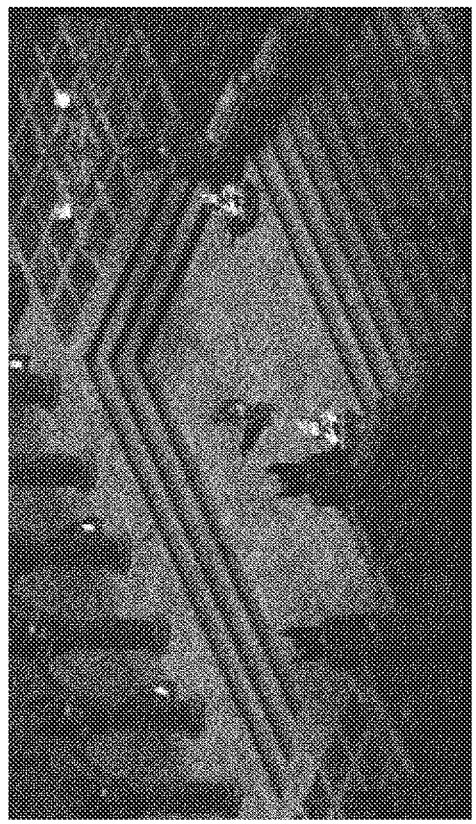
FIG. 3C illustrates a 3D representation of a 2D view in a game, in accordance with an embodiment of the present specification.
Figure 3D:
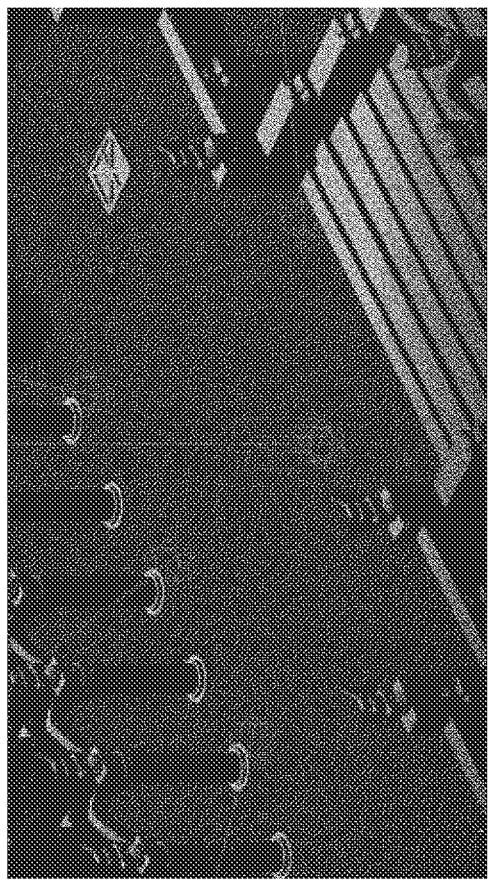
FIG. 3D illustrates a raycast map created for the 2D view, which is used to create the corresponding 3D view of FIG. 3C.

In an alternative embodiment, raycast mapping may be performed to determine the position of an object in the 3D world. A raycast is used to relate points on the original game's 2D ground plane to the equivalent point on a 3D ground plane which is aligned to the 2D ground plane in screen-space. Just as 3D objects are placed by content creators such that their silhouettes align on the screen, so can dynamic objects be placed in 3D such that their outline aligns with the equivalent object in 2D. In this embodiment, a physics plane is created that initially represents the ground plane in the flat 2D game world. If an object is positioned on the ground plane (i.e., at zero elevation), a ray cast from the position of the camera to position of the object on in the 2D world can be used to determine the object's position in the 3D game world. If an object is positioned above or below the ground plane (e.g., due to variations in the 3D landscape), the physics plane may be vertically offset by the height of the 3D terrain and, in some embodiments, along the orthographic camera forward vector before ray casting. Subsequently, the point where a ray cast from the position of the camera to the position of the object in the 2D world intersects the offset physics plane can be used to determine the object's position in the 3D game world. FIG. 3C illustrates a 3D representation of a 2D view in a game, in accordance with an embodiment of the present specification. FIG. 3D illustrates a raycast map created for the 2D view, which is used to create the corresponding 3D view of FIG. 3C.

Custom Tools

Custom tools are developed to facilitate in the authoring of the 3D data so that it can adhere to the 2D mapping. Referring to FIG. 1H, module 340 provides custom tools to designers for authoring 3D data. For example, screenshots of original 2D game spaces are transparently overlaid on 3D geometry being authored, and a game-accurate diametric camera constructed so that a designer/content creator can model objects that match the size and silhouette of the recreated objects. The choice of camera (diametric, or any other) is based on the type of perspective in 2D projection, so that a similar perspective is generated in the corresponding 3D projection. In some embodiments, the choice to transparently overlay 2D on 3D geometry or vice-versa is provided to the creator while authoring of the 3D data, with the help of module 340. Collision maps of the 2D space are used to set boundaries within which a creator may use tools to create the corresponding space in 3D, and place objects therein.

Figure 5:
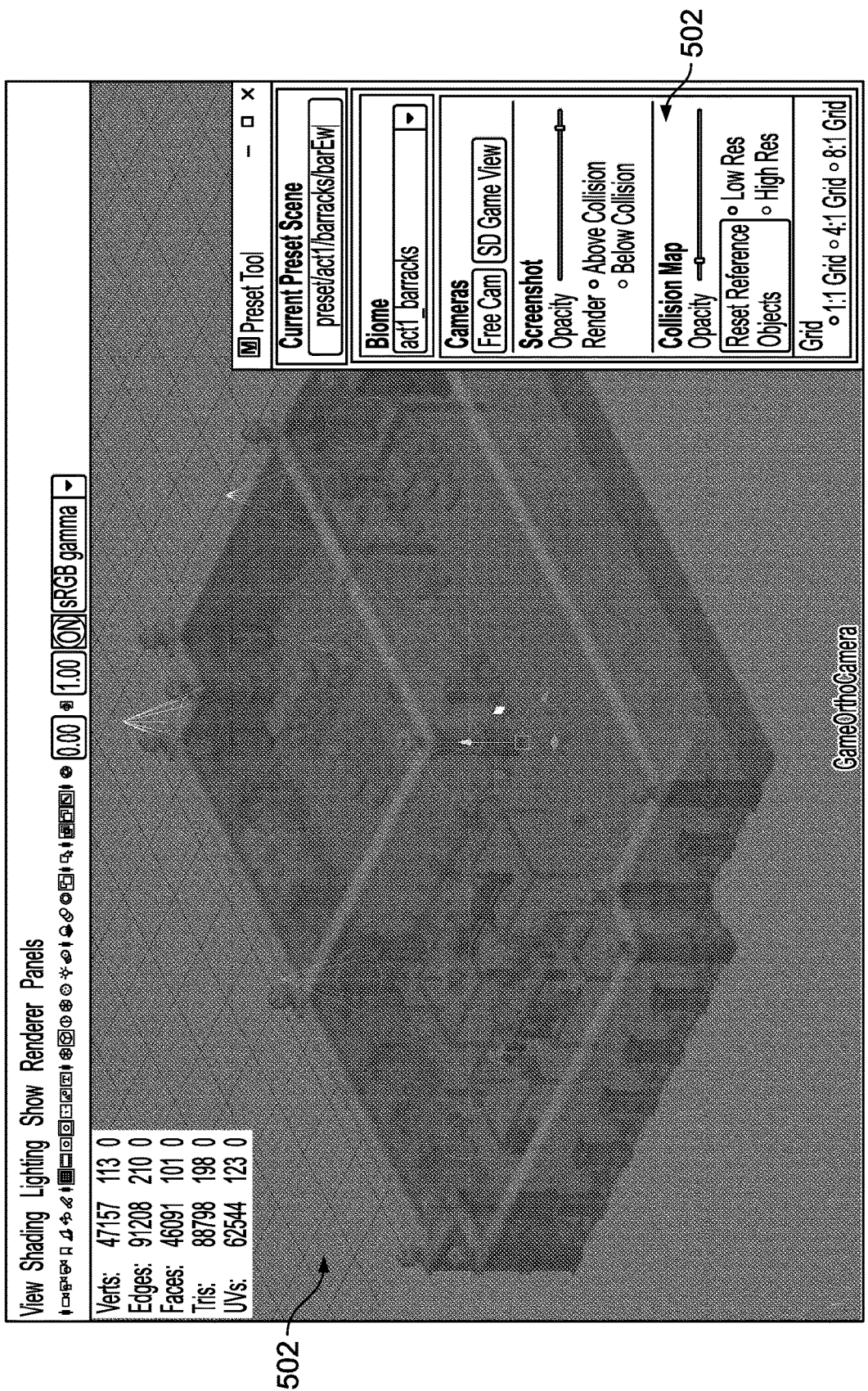

The representations illustrated in various figures, including FIGS. 2A, 2B, 3A, 3B, 4A, and 4B, are achieved using the custom tools in accordance with the embodiments of the present specification. FIG. 5 illustrates a diametric tool overlay created by the custom tools, in accordance with another embodiment of the present specification. Once a ground plane is mapped from 2D to a 3D space, objects on the ground plane are also mapped. Multiple functionalities of applications, such as Maya, are used by the various embodiments of the present specification and are enhanced with custom tools to create a remapped 3D game space. FIG. 5 illustrates an exemplary view of tools 502 used in an application such as Maya, in accordance with an embodiment of the present specification. Some exemplary set of tools used to customize the authoring of a 3D game space corresponding to a 2D game, in accordance with some embodiments of the present specification, include tools that allow designers to edit workflow, look, and feel of the of the 2D game space; tools that allow sculpting and shaping of models; using a library to enable Boolean operation on polygon geometry; tools to allow easy shading of complex scenes; viewing scene changes in real time including lighting and camera; among other tools.

In embodiments, generating the 3D visual representation of the dynamic objects comprises remapping coordinates of the dynamic objects in real time while a player plays the video game. In some embodiments, the 3D visual representation of the dynamic objects comprises using a raycast mapping of the dynamic objects in real time while a player plays the video game. Alternatively, the coordinates of at least one of the dynamic objects is used to map a position of the at least one dynamic object in real time while a player plays the video game.

Figure 6A:
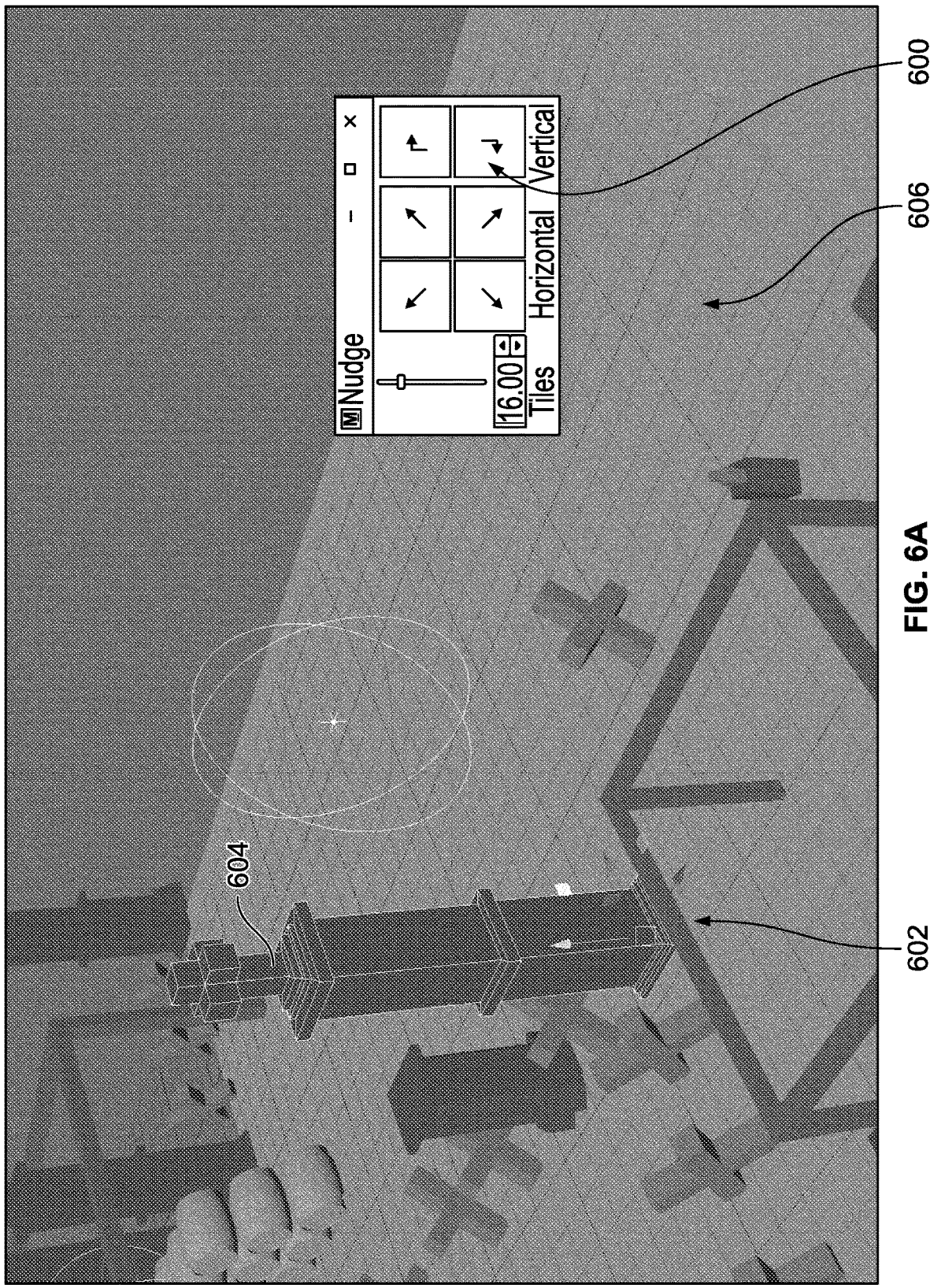
FIG. 6A illustrates a graphical user interface tool that enables content creators to move an object vertically while maintaining screen alignment with the 2D game, in accordance with some embodiments of the present specification.
Figure 6B:
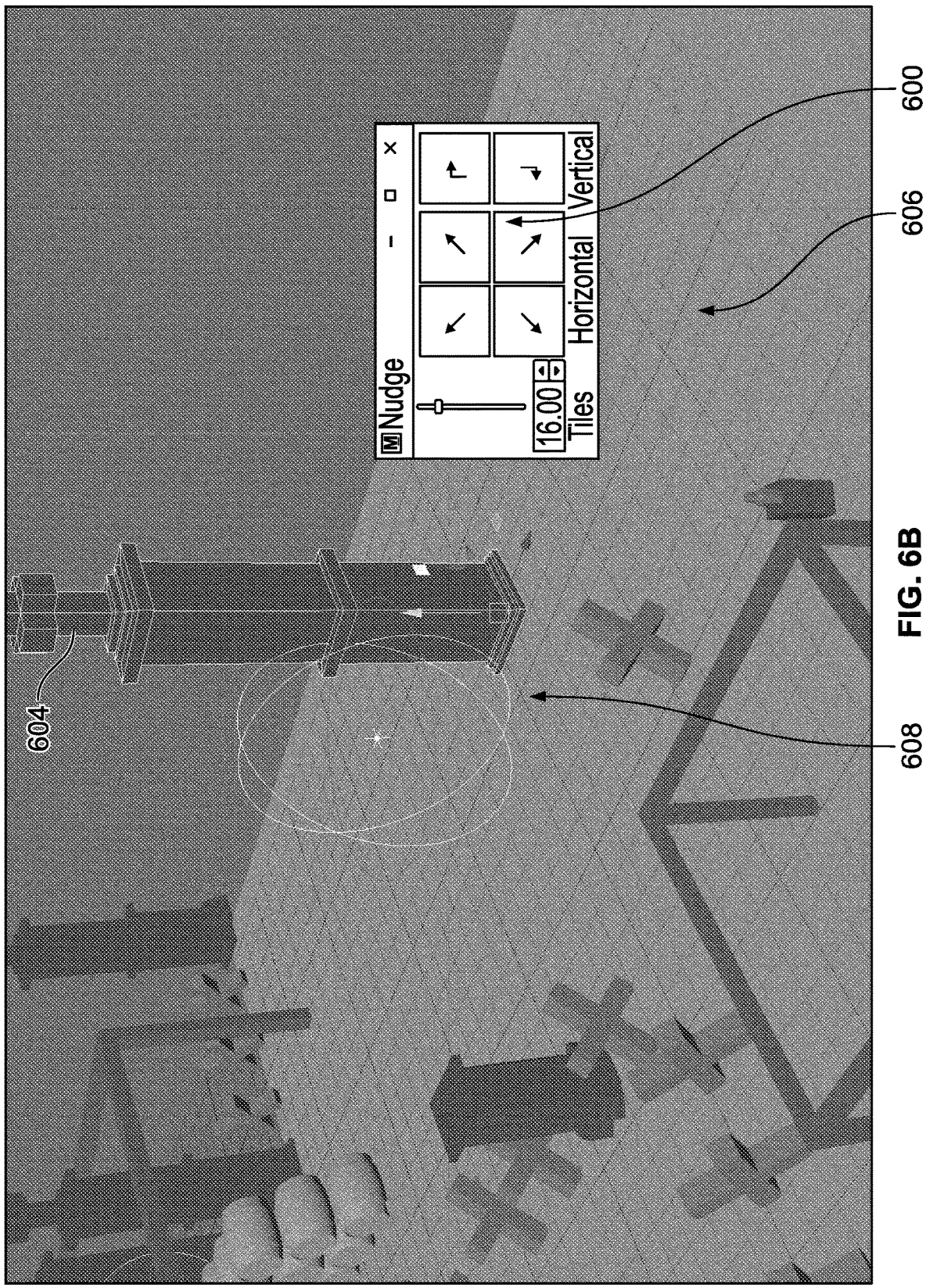
FIG. 6B illustrates the movement of object shown in FIG. 6A using the graphical user interface tool that enables content creators to move an object vertically while maintaining screen alignment with the 2D game, in accordance with some embodiments of the present specification.
Figure 6C:
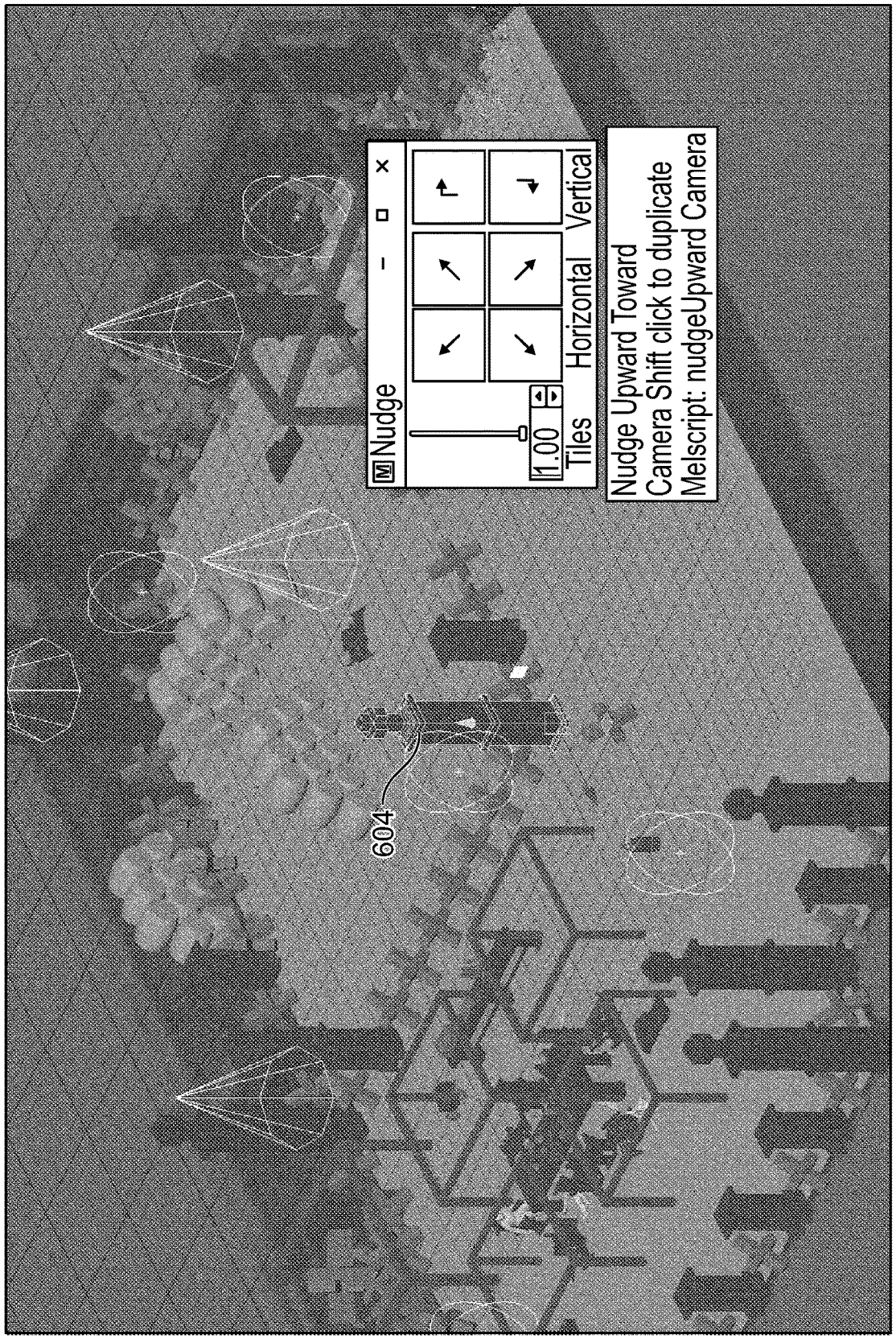
FIG. 6C depicts a view of the object of FIGS. 6A and 6B from an orthographic camera's point of view.

FIGS. 6A and 6B illustrate graphical user interface tools 600 that enable content creators to move objects vertically while maintaining screen alignment with the 2D game, in accordance with some embodiments of the present specification. FIG. 6A illustrates a first position 602 of an object 604 in the game 606, and FIG. 6B illustrates a second position 608 after moving the object 604 using tools 600. The tools 600 move object 604 along the camera's forward vector. FIG. 6C depicts a view of the object 604 from an orthographic camera's point of view. In the view shown by FIG. 6C, the object 604 does not appear to move. The views of FIGS. 6A and 6B, when seen one after the other, depict a nudge to object 604 when viewing the scene from a side.

Embodiments of the present specification build a 3D game using the game engine underlying the corresponding 3D game, which is an advanced alternative to simply improving resolution of the 2D game or building a game in 3D from scratch that imitates the 2D game. The result of using the embodiments of the present specification is an accurate and a high fidelity 3D representation of a 2D game.

The above examples are merely illustrative of the many applications of the system and method of present specification. Although only a few embodiments of the present specification have been described herein, it should be understood that the present specification might be embodied in many other specific forms without departing from the spirit or scope of the specification. Therefore, the present examples and embodiments are to be considered as illustrative and not restrictive, and the specification may be modified within the scope of the appended claims.

We claim:

1. A computer-implemented method of rendering a visual two-dimensional (2D) game space, generated by a 2D game engine, of a video game as a three-dimensional (3D) visual representation using at least one computing device, the method comprising:
    determining a perspective of a camera used in a generation of the visual 2D game space, wherein the perspective of the camera comprises a view of a ground plane and at least one object in the 2D game space and wherein determining said perspective comprises determining dimensions defining visual boundaries of the at least one object in the 2D game space, calculating a pitch of the camera based on a projection of one or more of the dimensions onto the camera's projection plane, calculating a yaw of the camera based on a projection of one or more of the dimensions onto the camera's projection plane, and determining a field of view of the camera;
    acquiring one or more screenshots of at least one portion of the 2D game space, wherein the one or more screenshots comprises the view of the ground plane and the at least one object;
    generating the 3D visual representation of the ground plane and the at least one object from the 2D game space using the one or more screenshots;
    overlaying the 3D visual representation based on the determined yaw, pitch, position, and field of view onto the 2D game space; and
    executing the video game with the overlaid 3D visual representation using the 2D game engine.

2. The computer-implemented method of claim 1, wherein the at least one object comprises static objects.

3. The computer-implemented method of claim 2, wherein the 3D visual representations of the static objects are manually created before playing the 2D game space.

4. The computer-implemented method of claim 1, wherein the at least one object comprises dynamic objects.

5. The computer-implemented method of claim 4, wherein generating the 3D visual representation of the dynamic objects comprises remapping coordinates of the dynamic objects in real time while a player plays the video game.

6. The computer-implemented method of claim 4, wherein the 3D visual representation of the dynamic objects comprises using a raycast mapping of the dynamic objects in real time while a player plays the video game.

7. The computer-implemented method of claim 4, further comprising using coordinates of at least one of the dynamic objects to map a position of the at least one dynamic object in real time while a player plays the video game.

8. A computer-implemented method of rendering a visual two-dimensional (2D) game space of a video game as a three-dimensional (3D) visual representation using at least one computing device, the method comprising:
    determining a perspective of a camera used in the generation of the visual 2D game space, wherein the perspective of the camera comprises a view of a ground plane in the 2D game space and wherein determining said perspective comprises determining dimensions defining visual boundaries of the at least one object in the 2D game space, calculating a pitch of the camera based on a projection of one or more of the dimensions onto the camera's projection plane, calculating a yaw of the camera based on a projection of one or more of the dimensions onto the camera's projection plane, and determining a field of view of the camera;
    configuring a 3D camera to replicate a 2D perspective;
    generating 3D data corresponding to 2D data; and,
    establishing a baseline 3D visual representation of the 2D game space using a game-accurate camera and based on the determined yaw, pitch, position, and field of view.

9. The computer implemented method of claim 8 wherein the 3D camera is based on the determined 2D camera perspective.

10. The computer-implemented method of claim 8 wherein the baseline 3D visual representation includes at least one boundary box.

11. The computer-implemented method of claim 8 wherein the baseline 3D visual representation includes at least one collision map object.

12. The computer-implemented method of claim 8, wherein the 3D data is generated using custom tools, wherein the custom tools include at least one of workflow editing of the 2D game space, sculpting and shaping of models, using a library to enable Boolean operation on polygon geometry, shading of complex scenes, or viewing scene changes in real time.

13. A computer readable non-transitory medium comprising a plurality of executable programmatic instructions wherein, when the plurality of executable programmatic instructions are executed by a processor in a computing device, a process for generating and displaying a three-dimensional (3D) visual representation of a two-dimensional (2D) video game space of a video game, wherein the plurality of executable programmatic instructions comprise:
   programmatic instructions, stored in the computer readable non-transitory medium, for determining a perspective of a camera used in the generation of the visual representation of the 2D video game space, wherein the perspective of the camera comprises a view of a ground plane and at least one object in the 2D video game space and wherein determining said perspective comprises determining dimensions defining visual boundaries of the at least one object in the 2D game space, calculating a pitch of the camera based on a projection of one or more of the dimensions onto the camera's projection plane, calculating a yaw of the camera based on a projection of one or more of the dimensions onto the camera's projection plane, and determining a field of view of the camera;
   programmatic instructions, stored in the computer readable non-transitory medium, for acquiring one or more screenshots of at least one portion of the 2D video game space, wherein the one or more screenshots comprises the view of the ground plane and the at least one object;
   programmatic instructions, stored in the computer readable non-transitory medium, for generating the 3D visual representation of the ground plane and the at least one object from the 2D video game space using the one or more screenshots and based on the determined yaw, pitch, position, and field of view; and
   programmatic instructions, stored in the computer readable non-transitory medium, for overlaying the 3D visual representation onto the 2D video game space.

14. The computer readable non-transitory medium of claim 13, wherein the at least one object comprises at least one of a static object or a dynamic object.

15. The computer readable non-transitory medium of claim 13, wherein the 3D visual representations of the static objects are manually created before playing the 2D video game space.

16. The computer readable non-transitory medium of claim 13, wherein generating the 3D visual representation of the dynamic objects comprises remapping coordinates of the dynamic objects in real time while a player plays the video game.

17. The computer readable non-transitory medium of claim 13, wherein the 3D visual representations of the dynamic objects comprise using a raycast mapping of the dynamic objects in real time while a player plays the video game.

18. The computer readable non-transitory medium of claim 13, further comprising using coordinates of at least one of the dynamic objects to map a position of the at least one dynamic object in real time while a player plays the video game.

\* \* \* \* \*